Patented Apr. 18, 1939

2,155,036

UNITED STATES PATENT OFFICE 2,155,036

HYDROGENATION PROCESS

Rollin J. Byrkit, Jr., Marshallton, Del., assignor to Hercules Powder Company, Wilmington, Del., a corporation of Delaware No Drawing. Application August 25, 1937, Serial No. 160,935

18 Claims. (Cl. 260—100)

This invention relates to a process for the continuous hydrogenation of unsaturated organic compounds and more particularly to a process for the continuous hydrogenation of rosins and other compounds which are difficult to hydrogenate.

Heretofore the hydrogenation of rosin has not been successfully accomplished from a practical standpoint, although the desirability of hydrogenated rosin has long been known, as shown by U. S. Patent 1,249,050 to Ellis and U. S. Patent 1,167,264, to Brooks. This has been due to the great difficulties involved and to limitations imposed by the development of the art of hydrogenation.

The hydrogenation of rosin in a batch or non-continuous process has been suggested heretofore, but has not met with commercial success. In such a process the rosin is placed in a closed vessel, as, for example, an autoclave, together with the catalyst in the form of a finely divided powder and hydrogen admitted under pressure. The conditions of temperature and hydrogen pressure are adjusted to meet the requirements of the hydrogenation process, and after a lapse of sufficient time the hydrogenation is more or less complete.

From the commercial or economic standpoint, and even from a technical standpoint, such non-continuous hydrogenation procedure is subject to many disadvantages, certain of which are due to the non-continuous nature of the process and others of which are due to the type of catalyst necessarily employed. Still other disadvantages are due to the characteristics of rosin, such as its physical state and active acidity. Among these disadvantages of processes for the hydrogenation of rosin heretofore practiced the following may be specifically considered.

At the conclusion of a batch hydrogenation it is necessary to filter or otherwise separate the hydrogenated rosin from the catalyst employed. This is a difficult filtration and must be accomplished in a heated filter press and the press-cake removed hot. This requires the maintenance of suitable equipment and represents an expensive and time-consuming operation. Where the catalyst used is in powder form, as is invariably the case, it can be separated from the viscous molten rosin only with very great difficulty.

The catalyst is in service for only a portion of the time required for a complete cycle of operations, since during the charging of the hydrogenation vessel, filtration and recovery of the filtered catalyst, the catalyst performs no useful function. In fact, the catalyst is often harmed by the exposure and necessary handling.

Because of this necessary handling and exposure the useful life of the hydrogenation catalyst is greatly shortened and its activity declines more rapidly than would be the case if it were subjected only to the use incident to hydrogenation. The diminution in activity of the catalyst is, in fact, due largely to the discontinuity of the hydrogenation and the active acid nature of the rosin. Furthermore, when the useful life of the catalyst is at an end it must be discarded, since the requisite reworking necessary to fit it for further use constitutes a greater expense than the procurement of new catalysts.

When a hydrogenation catalyst is used in a non-continuous hydrogenation process it is found that, unless it be a noble metal catalyst, the hydrogenated rosin produced is contaminated to an appreciable extent by the catalyst, and so far hydrogenation with noble metal catalysts has been used mainly as an instrument of laboratory technique due to its high cost. This contamination occurs each time the catalyst is used in the process with a corresponding loss of catalyst. Accordingly the hydrogenated rosin produced is contaminated in this manner, and the catalyst lost.

Because of the difficulties occasioned by the separation of catalyst from the hydrogenated rosin it is practically essential to maintain the ratio of catalyst to the rosin to be hydrogenated as low as possible. However, it is known that the rate of hydrogenation is usually in this type of hydrogenation proportional to the amount of catalyst present. Accordingly, maintaining a low catalyst ratio, while economically and practially necessary in non-continuous procedure, is extremely disadvantageous.

It is impossible to maintain the activity of the hydrogenation catalyst in non-continuous hydrogenation processes at a uniform level, although it is extremely desirable that this should be done. The only manner in which the catalyst activity may be maintained at an approximately uniform level in non-continuous processes is by the addition of small increments of fresh catalyst. It is apparent that this practice is limited by the total amount of catalyst which can be filtered and handled in the process.

The successful commercial hydrogenation of rosin involves the handling of large volumes of material. Since such hydrogenation requires the use of high hydrogenation pressures, the size of the autoclaves required for commercial operation is so massive as to be entirely impractical, due principally to their great cost.

These are a few of the disadvantages of the batch or non-continuous method of hydrogenating rosin. These are real difficulties which have, so far, effectively prevented the practical hydrogenation of rosin in spite of the desire for hydrogenated rosin in many commercial uses. Although continuous hydrogenation in the liquid phase has heretofore been carried out, the application has been limited to compounds which readily combine with hydrogen, and do not have a markedly unfavorable action upon the catalyst or where very high temperatures are used in connection with rugged, but relatively inactive, catalysts as in hydrogenation of petroleum. Such procedure has not been successful when applied to rosin. This is due in part to the extreme difficulty of hydrogenating the second double bond in the hydrocarbon nucleus of rosin acid which makes the hydrogenation of rosin and compounds containing a rosin acid nucleus to highly saturated materials extremely difficult, and in part to the very marked action of rosin and other chemically active compounds containing a rosin acid nucleus upon the types of catalysts heretofore used in continuous liquid phase hydrogenation.

It is the object of this invention to avoid these difficulties and to provide an efficient and economical process adapted for commercial operation by which unsaturated organic compounds, normally difficult to hydrogenate, may be continuously hydrogenated to a relatively high and uniform degree of saturation.

In accordance with this invention an unsaturated organic compound or other organic compound capable of hydrogenation in the liquid state is passed continuously through a stationary hydrogenation catalyst consisting of pellets of an activated nickel-silicon alloy catalyst in contact with hydrogen at superatmospheric pressure and at an elevated temperature.

The process in accordance with this invention is suitable for the hydrogenation of an unsaturated organic material which is a liquid at the temperatures and pressures required for hydrogenation, or which may be put into solution in a suitable solvent, and is particularly adapted for the hydrogenation of a rosin such as, for example, wood rosin, American gum rosin, French gum rosin, etc., and for the hydrogenation of compounds which contain the hydrocarbon nucleus of a rosin acid, such as, for example, esters of a rosin acid with a monohydric or polyhydric alcohol, as, methyl abietate, ethyl abietate, glycerol abietate and their homologues; the alcohols produced by the reduction of the carboxyl group of a rosin acid, as, abietyl alcohol, primaryl alcohol and their isomers; the esters of these alcohols and their isomers. Unsaturated organic compounds which contain the hydrocarbon nucleus of a rosin acid will for convenience be termed "rosinyl" compounds.

The catalyst to be used in accordance with my invention for the continuous hydrogenation of organic compounds may be produced by alloying together nickel and silicon as described in U. S. Patent No. 1,563,587 to Murray Raney, breaking this resultant alloy into fragments of the desired size and then treating the alloy with hydrogen or with an alkaline solution, such as sodium carbonate or sodium hydroxide, to dissolve the silicon from the surface of the fragments leaving them coated with a layer of catalytically active nickel.

In forming the nickel-silicon alloy from which the catalyst is prepared it is often desirable to include in the alloy a relatively small amount of other metal as, for example, copper, zirconium, cerium, cobalt, etc., which acts as a promoter and increases the activity of the resultant catalyst for certain hydrogenations. The activity of the catalyst may also be enhanced by heat-treating the alloy, as by annealing, quenching, etc.

For the hydrogenation of unsaturated organic compounds in accordance with this invention, the nickel-silicon alloy which may contain other metals as promoters, or which may have been subjected to heat treatment or both, is used in the form of particles or fragments graded to a size which will pass through holes in a perforated plate having a diameter of $\frac{1}{2}''$, and be retained on a perforated plate having holes $\frac{1}{16}''$ in diameter, and preferably of a size that will pass through holes in a perforated plate having a diameter of $\frac{1}{4}''$ and be retained on a perforated plate having holes $\frac{3}{32}''$ in diameter.

The most desirable size of the particles of the alloy is controlled by two opposing sets of factors. High yield of catalyst, low loss in activation and the tendency of the stream of the material being treated to pick up small particles of the alloy, suggest the use of large particles. On the other hand, high efficiency of hydrogenation, both as to degree of saturation and as to rate of production, suggest the use of fine particles. I have found in my process that the range of sizes passed by a plate perforated with $\frac{1}{4}''$ holes, but retained by a plate perforated with $\frac{3}{32}''$ holes gives the maximum efficiency in actual operation.

The catalyst alloy may be obtained in particles or fragments of the desired size by a "shotting" operation from the molten condition, or by casting the alloy in masses of a larger size and then crushing, as, for example, by means of a jaw crusher. After the grading operation, the particles which are too large may be further reduced in size or remelted, and the particles which are too small may be remelted and thus made suitable for further use.

These particles may then be activated by treatment with hydrogen or with an alkali and charged into the hydrogenation equipment. Since the catalyst after activation is intensely active and indeed pyrophoric in nature, it must be transferred to the hydrogenation equipment covered with a film of water or other protective coating. Alternatively, the unactivated alloy may be charged into the hydrogenation equipment and be activated therein, as, for example, by treatment with an alkali solution. If an alkali solution is used, the activated catalyst in place in the hydrogenation equipment will be washed free of alkali and other foreign substances with water and then dried by being heated in a current of an inert gas, as, for example, a current of hydrogen, super-heated steam, etc., or by displacement by suitable solvents as alcohol, acetone, etc.

In carrying out the process in accordance with this invention, the pellets of activated nickel-silicon alloy catalyst may be contained in a single reaction vessel through which the unsaturated material flows in liquid phase at suitable pressure and temperature while in contact with hydrogen. The unsaturated material may be passed through the catalyst bed at a rate which varies directly with the activity of the catalyst until the rate of flow becomes too slow to be practical, and then the spent catalyst replaced with fresh catalyst. In this way I may obtain a uniformly hydrogenated product over a considerable period.

Alternatively, I may place the pellets of activated nickel-silicon alloy catalyst in a plurality of reaction vessels or reactors and flow the unsaturated material successively through each of them at suitable pressure and temperature while in contact with hydrogen. In following this alternative procedure I pass the unsaturated compound through the plurality of reactors at a rate which may be varied directly with the activity of the catalyst until the activity of the catalyst becomes so low that the rate of flow is too slow to be practical, and then replace the spent catalyst in the first reactor with fresh catalyst and rearrange the order of the reactors so that this first reactor becomes the last or final reactor and the reactor which was second now becomes the first. The process is then continued until the rate again becomes slow and again the catalyst in the reactor which is now first (originally second) is replaced, the reactor placed at the end of the process, and the second reactor (originally third) made the first. This is then repeated periodically as long as the process is continued, and after each recharging the rate of flow may be stepped up to approximately its original value.

In this way, I obtain a cyclic process in which the untreated compound is first hydrogenated in the presence of the least active catalyst and then successively treated in the presence of lots of catalysts of greater and greater activity. Furthermore, I obtain a process in which any catalyst poisons which may be, and frequently are, present in the material being hydrogenated are trapped by the catalyst which is most nearly spent and, hence, least valuable.

Thus, I obtain a maximum efficiency of hydrogenation for the amount of catalyst used and produce uniformly hydrogenated products over long periods of time.

The hydrogen may if desired, be admixed with the material being hydrogenated as it enters the first reactor and flow concurrently with the material through the entire series of reactors. This is the most convenient method of operation and I prefer to use it. Alternatively, the hydrogen may be introduced into each of the reactors separately and flow either concurrently or countercurrently to the direction of flow of the material being hydrogenated. Again the hydrogen may be introduced into the final reactor and flow counter-currently throughout the series of reactors.

The hydrogenation equipment may be of any form generally used for continuous liquid phase hydrogenation and adapted to withstand the necessary pressures, but preferably it will consist of either a single tube of considerable length in comparison to its diameter or of a plurality of such tubes arranged either in series, in parallel, or in series-parallel.

The active hydrogenation catalyst being in place in the hydrogenation equipment, hydrogenation is begun initially by heating the equipment to the desired temperature, admitting hydrogen gas until the desired hydrogen pressure has been obtained and then admitting the molten rosin, or other rosinyl compound in liquid phase. The hydrogenated product may be withdrawn from the equipment clear and free from any suspended catalyst and in a condition such that no filtration whatsoever is required.

Considering only a single tube of the hydrogenation equipment the flow of hydrogen and of the molten rosin or other rosinyl compound through the tube may be conducted as follows: The hydrogen and the rosin or other compound to be hydrogenated may be fed in at the bottom of the tube and caused to flow upward through the catalyst with the hydrogenated product being drawn off at the top of the tube. The hydrogen and the rosin or other compound to be hydrogenated may be admitted at the top of the tube and allowed to flow down through the catalyst, the rosin flowing over and around the lumps of catalyst and the hydrogenated product being withdrawn at the bottom. The hydrogen may be admitted at the bottom and the rosin or other compound at the top of the tube, the two flowing countercurrently over the catalyst.

Where a plurality of tubes are arranged in series, in parallel, or in series parallel, one of the above described procedures may be followed exclusively, or the direction of flow will be varied in various of the tubes in one battery, the flow being parallel in some tubes and countercurrent in others. It will also be found advantageous to vary the temperature and hydrogen pressure in various of the tubes, although identical temperatures and pressures may be maintained in all the tubes if desired.

The temperature and pressure maintained during hydrogenation will depend upon the material being subjected to hydrogenation and the nature of the products desired. For the hydrogenation of compounds which are difficult to hydrogenate it is essential to proceed within rather definite ranges of conditions to obtain a sufficiently high degree of saturation to be of value. Rosin is an example of a compound which is difficult to hydrogenate, while acetone is an example of one which is easily hydrogenated.

Thus, for example, under a given set of conditions, while the first double bond in rosin and other rosinyl compounds can be hydrogenated at temperatures of about 100° C. and hydrogen pressures of about 100 lbs. or less per square inch, satisfactory hydrogenation of the second double bond requires temperatures of the order of 210° C. to 230° C. and hydrogen pressures of 4000 to 5000 lbs. per square inch. Under other conditions, however, as for example, when dissolved in a solvent, as naphtha, isopropyl ether, etc., temperatures as low as 70° C. and hydrogen pressures as low as 100 lbs. per square inch may be used with satisfactory results.

For the hydrogenation of rosin in the molten condition, I have found that it is desirable to use a temperature within the range of about 125° C. to about 300° C. and a hydrogen pressure in excess of 1000 lbs. per square inch, and preferably a temperature within the range of about 180° C. to 220° C. and a pressure within the range of 2500 to 5000 lbs. per square inch. Pressures in excess of 5000 lbs. per square inch are desirable from the standpoint of the degree of saturation secured, but ordinarily the advantage gained does not balance the increased difficulties of operation, cost of compression, etc.

When the rosin or other chemically active unsaturated compound is first passed through freshly prepared nickel-silicon alloy catalyst it will be found that the first samples of hydrogenated product show an appreciable nickel content. However, after the equipment has been in operation for about 2 to 3 hours the nickel content will be found to drop to the order of one part per million and will remain at this exceedingly low figure as long as the continuity of the process is maintained. After an interruption in the process the nickel content will rise again for a short time and will then fall once more to this very low value.

When the catalyst has become inactive due to long continued use, it may be reactivated by treatment with an alkali solution, as, for example a caustic soda solution. Prior to this reactivation treatment, it may be found desirable to extract the spent catalyst with a solvent for the rosin or other compound being hydrogenated. In some cases it will be found advantageous to give the spent catalyst an acid pickle prior to the reactivation treatment.

The method in accordance with this invention presents very definite advantages. It obtains maximum efficiency from the catalyst used, and allows the production of a hydrogenated product having a uniform degree of saturation and free from appreciable catalyst contamination. It presents safety of operation unobtainable in batch operation, due to the comparatively small amount of material and hydrogen under high pressure at any one time. It provides economy of operation, by avoiding filtration of the hydrogenated product, by avoiding consumption of catalyst in contaminating the rosin and, if desired, by recirculating the excess hydrogen at high pressure, instead of expanding it and then recompressing it.

It will be understood that the details and examples hereinbefore set forth are illustrative only, and that the invention as herein broadly described and claimed is in no way limited thereby.

This application is a continuation-in-part of my application Serial No. 5,067, filed February 5, 1935, which issued as U. S. Patent 2,094,117.

What I claim and desire to protect by Letters Patent is:

1. A method for the continuous hydrogenation of an unsaturated organic compound, which includes flowing the said compound in liquid phase in the presence of hydrogen under superatmospheric pressure and at a suitable elevated temperature past a catalyst comprising essentially an activated nickel-silicon alloy.

2. A method for the continuous hydrogenation of a rosinyl compound, which includes flowing the said compound in liquid phase in the presence of hydrogen under superatmospheric pressure and at a suitable elevated temperature past a catalyst comprising essentially an activated nickel-silicon alloy.

3. A method for the continuous hydrogenation of a rosinyl compound, which includes flowing the rosin in liquid phase in the presence of hydrogen under superatmospheric pressure and at a suitable elevated temperature past a catalyst comprising essentially an activated nickel-silicon alloy.

4. The method of hydrogenating a rosinyl compound which includes flowing a rosinyl compound in liquid phase in the presence of hydrogen under superatmospheric pressure and at a temperature of from about 70° C. to about 300° C. past a catalyst comprising essentially an activated nickel-silicon alloy.

5. The method of hydrogenating a rosinyl compound which includes flowing a rosinyl compound in liquid phase in the presence of hydrogen under a pressure of from about 100 pounds to the square inch to about 5000 pounds to the square inch and at a suitable elevated temperature past a catalyst comprising essentially an activated nickel-silicon alloy.

6. The method of hydrogenating rosin which includes flowing rosin in liquid phase in the presence of hydrogen under a pressure of from about 4,000 pounds to the square inch to about 5,000 pounds to the square inch and at a temperature of from about 210° C. to about 230° C. past a catalyst comprising essentially an activated nickel-silicon alloy.

7. The method of hydrogenating rosin which includes flowing rosin in liquid phase in the presence of hydrogen under a pressure of from about 100 pounds to the square inch to about 5,000 pounds to the square inch and at a temperature of from about 70° C. to about 300° C. past a catalyst comprising essentially an activated nickel-silicon alloy.

8. The method of hydogenating rosin which includes flowing rosin in liquid phase in the presence of hydrogen under superatmospheric pressure and at a suitable elevated temperature past a catalyst comprising essentially an activated nickel-silicon alloy in the form of lumps of a size to pass through a half inch mesh screen and be retained on a ten mesh screen.

9. The method of hydrogenating a rosin ester which includes flowing a rosin ester in liquid phase in the presence of hydrogen under superatmospheric pressure and at a suitable elevated temperature past a catalyst comprising essentially an activated nickel-silicon alloy.

10. The method of hydrogenating methyl abietate which includes flowing methyl abietate in liquid phase in the presence of hydrogen under superatmospheric pressure and at a suitable elevated temperature past a catalyst comprising essentially an activated nickel-silicon alloy.

11. The method of hydrogenating glycerol abietate which includes flowing glycerol abietate in liquid phase in the presence of hydrogen under superatmospheric pressure and at a suitable elevated temperature past a catalyst comprising essentially an activated nickel-silicon alloy.

12. The method of hydrogenating an abietyl compound which includes contacting an abietyl compound at an elevated temperature with hydrogen under superatmospheric pressure in the presence of a catalyst comprising essentially an activated, heat-treated nickel-silicon alloy.

13. The method of hydrogenating an abietyl compound which includes contacting an abietyl compound at an elevated temperature with hydrogen under superatmospheric pressure in the presence of a catalyst comprising essentially an activated alloy of nickel, silicon, and a metal selected from the group consisting of copper, zirconium, cerium and cobalt.

14. The method of hydrogenating a rosin which includes flowing rosin in liquid phase in the presence of hydrogen past a catalyst comprising essentially a heat-treated nickel-silicon alloy.

15. The method of hydrogenating rosin which includes flowing rosin in liquid phase in the presence of hydrogen past a catalyst comprising essentially an activated alloy of nickel, silicon and a metal selected from the group consisting of copper, zirconium, cerium and cobalt.

16. The method of hydrogenating a rosinyl compound which includes contacting a rosinyl compound at an elevated temperature with hydrogen under superatmospheric pressure in the presence of a catalyst comprising essentially an activated, heat-treated nickel-silicon alloy.

17. The method of hydrogenating a rosinyl compound which includes contacting a rosinyl compound at an elevated temperature with hydrogen under superatmospheric pressure in the presence of a catalyst comprising essentially an activated alloy of nickel, silicon, and a metal selected from the group consisting of copper, zirconium, cerium and cobalt.

18. The method of hydrogenating rosin which includes flowing rosin in liquid phase in the presence of hydrogen under a pressure of from about 2500 pounds per square inch to about 5000 pounds per square inch and at a temperature of from about 180° C. to about 220° C., past a catalyst comprising essentially an activated nickel-silicon alloy.

ROLLIN J. BYRKIT, Jr.